United States Patent [19]

Panek et al.

[11] 4,411,819

[45] * Oct. 25, 1983

[54] THICKENING AQUEOUS COMPOSITIONS WITH POLYETHERS MODIFIED WITH ALPHA-OLEFIN OXIDES

[75] Inventors: Edward J. Panek, Trenton; Pauls Davis, Gibraltar, both of Mich.

[73] Assignee: BASF Wyandotte Corporation, Wyandotte, Mich.

[*] Notice: The portion of the term of this patent subsequent to Jan. 26, 1999, has been disclaimed.

[21] Appl. No.: 209,437

[22] Filed: Nov. 24, 1980

Related U.S. Application Data

[62] Division of Ser. No. 86,840, Oct. 22, 1979, abandoned.

[51] Int. Cl.³ .............................................. B01J 13/00
[52] U.S. Cl. .................................. 252/315.1; 252/73; 568/624
[58] Field of Search ............... 568/624, 620, 607, 608, 568/625; 252/316, 73

[56] References Cited

U.S. PATENT DOCUMENTS

| | | | |
|---|---|---|---|
| 3,427,382 | 2/1969 | Haefele | 252/316 X |
| 3,562,337 | 2/1971 | Lamberti et al. | 568/680 |
| 3,706,714 | 12/1972 | Lloyd et al. | 528/76 |
| 3,748,276 | 7/1973 | Schmolka | 568/620 X |
| 3,829,506 | 8/1974 | Schmolka et al. | 568/624 |
| 4,159,975 | 7/1979 | Praetorius et al. | 525/91 |
| 4,230,612 | 10/1980 | Praetorius et al. | 524/505 |
| 4,302,349 | 11/1981 | Kosswig et al. | 252/174.21 |
| 4,303,544 | 12/1981 | Kosswig et al. | 252/174.21 |
| 4,304,902 | 12/1981 | Landoll | 528/419 |
| 4,312,775 | 1/1982 | Panek et al. | 252/316 |

*Primary Examiner*—Richard D. Lovering
*Attorney, Agent, or Firm*—David L. Hedden

[57] ABSTRACT

Polyethers having molecular weights of about 1000 to about 75,000 modified with alpha-olefin oxides having about 12 to about 18 carbon atoms exhibit increased thickening efficiency in aqueous systems. About 1 to about 20 percent by weight based upon the weight of the polyether is required, the proportion of alpha-olefin oxide modifier varying inversely with the molecular weight of the polyether. Modified polyethers, processes for the preparation of thickened aqueous systems, and thickened aqueous compositions are disclosed. The modified polyether thickening agents of the invention are particularly useful for thickening water or water-glycol mixtures which are useful as hydraulic fluids.

23 Claims, No Drawings

THICKENING AQUEOUS COMPOSITIONS WITH POLYETHERS MODIFIED WITH ALPHA-OLEFIN OXIDES

This is a division of application Ser. No. 86,840 now abandoned, filed Oct. 22, 1979.

BACKGROUND OF THE INVENTION

1. Field of the Invention

This invention relates to thickeners for aqueous systems based upon polyethers of high molecular weight.

2. Prior Art

Polymeric water-soluble thickening agents are widely used for many purposes. Commercially available polymeric thickeners differ widely in chemical composition. The diversity of available thickening agents is an indication that not all are equally useful. It is not unusual to find some thickening agents which perform well in a certain environment and not at all in another environment. In fact, in some uses, no one thickening agent is completely satisfactory and there is a continual need and a continuing search for new thickening agents to satisfy many unmet needs. For instance, various cellulose derivatives or other water-soluble polymers such as sodium polyacrylates, polyacrylamides and polyethylene glycol fatty acid diesters are representative thickening agents. The polyethylene glycol fatty acid diesters are widely used for textile printing emulsions, cosmetic emulsions, and aqueous pigment suspensions. These esters suffer from the defect that they are not resistant to hydrolysis in an acid or alkaline medium so that under such conditions the thickening effect initially obtained is gradually reduced.

Polyoxyalkylene compounds, including high molecular weight materials are well known for use as surface-active agents, as disclosed in U.S. Pat. No. 2,674,619. These compositions can be prepared at high molecular weights, for instance, up to 25,000 for use as aqueous thickeners. It is known that liquid polyoxyalkylenes can be obtained by utilizing a mixture of ethylene oxide and another lower alkylene oxide in an oxide ratio of from 75 to 90 percent ethylene oxide to 10 to 25 percent other lower alkylene oxides such as propylene oxide, as taught in U.S. Pat. No. 2,425,755. The polyether polyols of the prior art having high thickening efficiency are generally those having the highest molecular weights reasonably obtainable under commercial conditions with price considerations being a limiting factor. Because high molecular weight polyethers require a disproportionately longer processing time to produce, it would be desirable to prepare high efficiency thickeners utilizing lower molecular weight polymers.

In U.S. Pat. No. 3,538,033, there are disclosed polyoxyalkylene derivatives of diepoxides having thickening properties. The thickener compositions disclosed are useful for thickening aqueous systems and are prepared by reacting a diepoxide compound having at least 12 carbon atoms with an alkylene oxide adduct containing from 100 to 250 moles of ethylene oxide units.

In U.S. Pat. No. 3,829,506, there are disclosed biodegradable surface-active agents having good foam properties and foam stabilizing characteristics prepared by copolymerizing ethylene oxide alone or with another lower alkylene oxide and an alpha olefin oxide in the presence of a polyhydric alcohol. Molecular weights of 400 to 6000 are claimed but there is no indication that the compositions are useful as thickening agents for aqueous systems.

In U.S. Pat. No. 3,475,499, there is disclosed the preparation of glycols and glycol ethers by reacting with water 1,2-epoxides having 3 to 30 carbon atoms. The compositions are disclosed as useful in the preparation of detergents. High molecular weight polyether block polymers are disclosed in U.S. Pat. No. 3,535,307. Such compositions have molecular weights of about 2000 to about 25,000 and are useful in the preparation of polyurethanes.

SUMMARY OF THE INVENTION

Polyethers useful as thickening agents for aqueous systems are disclosed which are prepared by reacting a mixture of ethylene oxide and at least one lower alkylene oxide having 3 to 4 carbon atoms in the presence of an active hydrogen-containing compound initiator and at least one alpha-olefin oxide having about 12 to about 18 carbon atoms. Alternatively, capped copolymer polyether thickeners are prepared by first preparing a polyether by reacting ethylene oxide or ethylene oxide and at least one lower alkylene oxide having 3 to 4 carbon atoms in the presence of an active hydrogen-containing compound containing at least 2 active hydrogens and subsequently reacting the product obtained with an alpha-olefin oxide having about 12 to about 18 carbon atoms. The (1) alpha-olefin oxide capped heteric and block copolymers of ethylene oxide and at least one lower alkylene oxide having 3 to 4 carbon atoms and (2) alpha-olefin oxide capped homopolymers of ethylene oxide are useful thickening agents of the invention. The polyether thickening agents of the invention having molecular weights of about 1000 to about 75,000, preferably about 1000 to about 40,000, and are particularly useful in the thickening of water-ethylene glycol mixtures useful as hydraulic fluids. Polyether thickening agents, processes for the preparation of thickened aqueous systems and thickened aqueous compositions are disclosed.

DETAILED DESCRIPTION OF THE INVENTION

Polyether thickening agents having greatly improved thickening efficiency can be obtained by modifying conventional polyether thickening agents with an alpha-olefin oxide having about 12 to about 18 carbon atoms or mixtures thereof. It has been found that whether said alpha-olefin oxide is incorporated in the modified-polyether or by copolymerization to produce a heteric polyether or by capping a heteric, block, or homopolymer polyether, that greatly improved thickening efficiency without reduction in viscosity stability under high shear conditions results.

It is well known that polyethers, in comparison with esters of polyalkylene glycols, are resistant to hydrolysis in aqueous or alcoholic media under acid and alkaline conditions or under the effects of heating at elevated temperatures. Thus, under conditions where a thickening agent must maintain a substantial proportion of its thickening efficiency under conditions favoring hydrolysis of the polymer, polyether-type thickening agents are a desirable choice. Heretofor, highly efficient polyether thickeners for aqueous systems could be obtained only by utilizing high molecular weight polyether polymers such as those having a molecular weight of at least 20,000 to 25,000. The modified polyethers of the invention provide greatly increased thickening efficiency without reduction in shear stability under conditions favoring hydrolysis.

The preparation of polyethers is well known in the art. Generally, polyethers are prepared utilizing at least one lower alkylene oxide, an active hydrogen containing compound, and an acid or basic oxyalkylation catalyst in the presence of an inert organic solvent at elevated temperatures in the range of about 50° C. to 150° C. under an inert gas pressure, generally from about 20 to about 100 lbs. per square inch gauge.

Any suitable prior art alkaline oxyalkylation catalyst can be used in the practice of this invention. These include, for example, strong bases, such as sodium hydroxide, sodium methylate, potassium hydroxide, and the like; salts of strong bases with weak acids, such as sodium acetate, sodium glycolate, and the like and quaternary ammonium compounds, such as benzyl dimethyl cetyl ammonium compounds and the like. The concentration of these catalysts in the reaction mixture is not critical and may vary from about 0.1 percent to 5 percent by weight of the initiator compound.

An inert organic solvent may be utilized in the above-described procedures. The amount of solvent used is that which is sufficient to provide a suitable reaction medium and is generally, on a molar basis, in excess of the total amount of the reactants. Examples of suitable solvents include aliphatic hydrocarbons, such as hexane, heptane, isoheptane; aromatic hydrocarbons, such as benzene, toluene, xylene; chlorinated hydrocarbons, such as carbon tetrachloride, ethylene dichloride, propylene dichloride; and oxygenated hydrocarbons, such as diethyl ether, dimethyl ether, anisole, and the like.

In accordance with this invention, a copolymer polyether is prepared by mixing ethylene oxide and at least one lower alkylene oxide having 3 to 4 carbon atoms with a low molecular weight active hydrogen-containing compound initiator having at least two active hydrogens and preferably, 2 to 6 active hydrogen atoms such as a polyhydric alcohol, containing from 2 to 10 carbon atoms and from 2 to 6 hydroxyl groups and from about 5.0 mole to 15.0 moles of an alpha-olefin oxide having from 12 to 18 carbon atoms per mole of alcohol; heating said mixture to a temperature in the range of abut 50° C. to 150° C., preferably from 80° C. to 130° C., under an inert gas pressure preferably from about 30 p.s.i.g. to 90 p.s.i.g. A mixture of ethylene oxide and other alkylene oxides having from three to four carbon atoms is used in said mixture in an amount so that the resulting polyether product will contain at least 10 percent by weight, preferably about 70 percent to about 99 percent by weight, ethylene oxide residue. Said mixture is maintained at a temperature and pressure in said range for a period of about one hour to ten hours, preferably one to three hours.

Alternatively block or heteric polymers of ethylene oxide and at least one lower alkylene oxide having 3 to 4 carbon atoms can be prepared as intermediates. These are then capped with said alpha-olefin epoxide to prepare the thickeners of this invention. Ethylene oxide homopolymers capped with said alpha-olefin oxides are also useful. If desired, a catalyst may be added to the reaction mixture prior to the ethylene oxide addition. Alkaline catalysts such as potassium hydroxide or acid catalysts such as boron trifluoride are useful, as is well established in the art.

As is well known in the art, polyethers are prepared utilizing an initiator compound which contains a reactive (or active) hydrogen atom. The term reactive hydrogen atom is well known and clearly understood by those skilled in the art. However, to remove any possible ambiguity in this regard, the term reactive hydrogen atom, as used herein and in the appended claims, includes any hydrogen atom fulfilling the following two conditions:

1. It is sufficiently labile to open the epoxide ring of propylene oxide, and
2. It reacts with methyl magnesium iodide to liberate methane in the classical Zerewitinoff reaction (see Niederle and Niederle, Micromethods of Quantitative Organic Analysis, p. 263, John Wiley and Sons, New York City, 1946).

The reactive hydrogen atoms which will fulfill the above two conditions are normally activated by being a member of a functional group containing an oxygen atom, e.g., a hydroxyl group, a phenol group, a carboxylic acid group; a basic nitrogen atom, e.g., an amine group, a hydrazine group, an imine group, an amide group, a guanidine group, a sulfonamide group, a urea group, a thiourea group; or a sulfur atom, e.g., a mercaptan, a thiophenol, a thiocarboxylic acid, hydrogen sulfide. Alternatively, certain hydrogen atoms may be activated by proximity to carbonyl groups such as those found in cyanoacetic esters, acetoacetic esters, malonic esters, as is well known in the art. Generally, polyhydric alcohol initiators selected from the alkane polyols, alkene polyols, alkyne polyols, aromatic polyols, and oxyalkylene polyols are useful initiators. Specific examples of base compounds which may be used in preparing the polyoxyalkylene polymers of the invention include ethylene glycol, 1,3-butylene glycol, oxalic acid, mono-, di-, and triethanolamine, butylamine, aniline, resorcinol, diethylmalonate, glycerol, polyglycerol, sucrose, butanediol, oxalic acid, diethylmaleate, pentaerythritol, sucrose, ethylene diamine, bisphenol A, hydroquinone, etc.

Of the alkane polyols such as ethylene glycol, propylene glycol, 1,4-butanediol, 1,2-butanediol, trimethylol propane, glycerol, 2,3,5,6-hexane tetrol, sorbitol, pentaerythritol, glucose, sucrose, and the like, polyhydric alcohols having about 2 to about 10 carbon atoms and from about 2 to about 6 hydroxy groups are preferred initiators. Alkene polyols having about 2 to about 10 carbons and from about 2 to about 6 hydroxyl groups are also useful such as 2-butene-1,4-diol, 2-hexene-1,4,6-triol, 3-heptene-1,2,6,7-tetrol, 1,5-hexadiene-3,4-diol and the like as well as the alkylene polyols such as 2-butyne-1,4-diol, 2-hexyne-1,4,6-triol, 4-octyne-1,2,7,8-tetrol and the like. The oxyalkylene polyols, such as diethylene glycol, triethylene glycol, tetraethylene glycol, dipropylene glycol, tripropylene glycol, and the like are also useful.

The heteric or block copolymers of the invention which are capped, i.e., copolymerized with an alpha-olefin oxide having about 12 to about 18 carbon atoms are mixtures with ethylene oxide of lower alkylene oxides having 3 to 4 carbon atoms. Generally, the proportion of ethylene oxide residue in the copolymers of the invention is at least 50 percent by weight and preferably is 70 to 90 percent by weight of the total mixture of ethylene oxide residue and the alkylene oxide residue having 3 to 4 carbon atoms. The lower alkylene oxides referred to are propylene oxide and the butylene oxides such as 1,2-butylene oxide and 2,3-butylene oxide, and tetrahydrofuran. The proportion of lower alkylene oxides having 3 to 4 carbon atoms utilized in combination with ethylene oxide is generally less than 50 percent by weight of the mixed copolymer and preferably is 30 to 10 percent by weight thereof.

The alpha-olefin oxides which are utilized to modify the polyethers of the prior art are those oxides generally containing about 12 to about 18, preferably about 14 to 18, carbon atoms and the commercially available mixtures thereof. The amount of alpha-olefin oxide required to obtain the more efficient polyether thickening agents of the invention is generally about 1 to about 20 percent, preferably abut 1 to about 10 percent, by weight of the total weight of the polyether thickeners of the invention. This amount of alpha-olefin oxide based upon the molar amount of active hydrogen-containing initiator compound is about 5.0 mole to about 15.0 moles of alpha-olefin oxide per mole of di- or trifunctional active hydrogen-containing initiator. Most preferably, the alpha-olefin oxide contains a mixture of 14 to 16 carbon atoms and linear alkyl chains. Examples of useful alpha-olefin oxides are those commercially available under the trademark VIKOLOX.

Since the preparation of heteric and block copolymers of alkylene oxides and ethylene oxide homopolymers are well known in the art, further description of the preparation of said polymers is unnecessary. Further details of the preparation of heteric copolymers of lower alkylene oxide can be obtained in U.S. Pat. No. 3,829,506, incorporated herein by reference. Further information on the preparation of block copolymers of lower alkylene oxides can be obtained in U.S. Pat. No. 3,535,307, incorporated herein by reference.

Alternatively to the use of the above-described alpha-olefin oxides to modify high molecular weight polyether polyols, it is possible to substitute glycidyl ethers which can be prepared by reaction of an alcohol having 12 to about 18 carbon atoms with epichlorohydrin in accordance with the teachings of U.S. Pat. No. 4,086,279 and references cited therein, all incorporated by reference.

The following examples will illustrate the preparation of the modified polyethers of the invention wherein a conventional polyether is modified with an alpha-olefin oxide to provide improved thickening efficiency.

EXAMPLE 1

(Control or Comparative Example)

A conventional polyether derived from ethylene oxide and 1,2-propylene oxide in the ratio of 75 percent ethylene oxide and 25 percent 1,2-propylene oxide was prepared by reaction with trimethylol propane in two stages in a stainless steel autoclave. An intermediate product was first prepared by reacting a mixture of trimethylol propane, potassium hydroxide, 1,2-propylene oxide, and ethylene oxide for a period of 18 hours at 120° C. The cooled liquid product was discharged into a glass container.

The final product was prepared by reacting this intermediate product with 1,2-propylene oxide and ethylene oxide under a nitrogen atmosphere at 115° C. for 22 hours. The reaction mixture was then cooled and the viscous liquid product transferred to a glass container. The product had a molecular weight of about 23,000.

EXAMPLE 2

(Control or Comparative Example)

A two-liter glass vessel was charged with 1221 grams of the product prepared in Example 1 and heated to 110° C. under a nitrogen atmosphere before reacting with 2.4 grams of sodium while stirring for 18 hours. The intermediate product obtained was cooled before further use. Using 920 grams of the above intermediate in admixture with 27.6 grams of an alpha-olefin epoxide having a carbon chain length of 10, the mixture was blended in a Waring blender. A 170.3 gram portion of the mixture was charged to a 250 milliliter centrifuge bottle. The bottle was capped with a rubber stopper and heated in a steam bath for 70 hours. After cooling, the product obtained was transferred to a glass container. The product had a molecular weight of about 25,000.

EXAMPLE 3

(Control or Comparative Example)

In this example, a heteric copolymer of ethylene oxide and 1,2-propylene oxide is prepared having a molecular weight of about 7000. Subsequently, this base heteric copolymer is further reacted with an alpha-olefin epoxide having 20 carbon atoms in the alkyl chain.

Following the procedure of Example 1, and utilizing appropriately reduced proportions, a heteric copolymer of ethylene oxide and 1,2-propylene oxide was prepared having a molecular weight of about 7000. A five-liter glass vessel was charged with 3361 grams of the above-prepared copolymer and the vessel was placed under vacuum and heated to 120° C. while stirring for five hours to remove volatiles. 3.7 grams of volatiles were collected in a cold trap. The vacuum was relieved with nitrogen and 23.5 grams of sodium were added in three portions over a period of 4 hours. After an additional two-hour reaction time at 120° C., 428.7 grams of an alpha-olefin epoxide having a 20 carbon atom alkyl chain was added all at once. After reacting for a period of 10 hours, the reaction mixture was cooled and the product transferred to a glass container.

EXAMPLE 4

Into a two-gallon stainless steel mixer there was charged 3400 grams of the copolymer prepared in Example 1. The contents of the mixer were blanketed with nitrogen and then heated by steam utilizing an external jacket on the mixer. There was then added 6.8 grams of sodium and the mixture was stirred while the reaction was allowed to continue. After 3.5 hours, 34 grams of a mixture of alpha-olefin epoxides having an aliphatic chain length of 15 to 18 carbon atoms, sold under the trademark VIKOLOX 15-18 by the Viking Chemical Company, was added at once. The stirring and heating was continued for another 43 hours before the reaction mixture was cooled and the viscous product transferred to a glass container.

EXAMPLE 5

Following the procedure and proportions of Example 4, except that 68 grams of the alpha-olefin oxide having a chain length of 15 to 18 aliphatic carbons was utilized, a viscous product was prepared.

EXAMPLE 6

The procedure of Example 4 was followed utilizing the same proportions thereof with the exception that 102 grams of VIKOLOX 15-18 was used to prepare a viscous product.

EXAMPLE 7

Utilizing a two-liter glass vessel, 1221 grams of the product of Example 1 was added thereto and heated to a temperature of 110° C. under a nitrogen atmosphere before adding 2.4 grams of sodium and reacting the mixture while stirring for 18 hours. The intermediate product obtained was cooled before further use and then 920 grams of the above intermediate product were reacted with 18.4 grams of an alpha-olefin oxide having an aliphatic chain of 14 to 16 carbon atoms sold under the trademark VIKOLOX 14–16 by the Viking Chemical Company. Into a 250 milliliter centrifuge bottle there was charged 170.3 grams of the above mixture prepared by blending the above intermediate with the above alpha-olefin oxide. The bottle was capped with a rubber stopper and heated in a steam bath for 70 hours to obtain a viscous product which was transferred to a glass container for storage.

EXAMPLE 8

The procedure and proportions of Example 7 were used except that 27.6 grams of the alpha-olefin oxide having an aliphatic carbon chain length of 14 to 16 carbons was used to prepare a viscous product which was transferred to a glass container following reaction.

EXAMPLE 9

The procedure and proportions of Example 7 were followed except that an alpha-olefin oxide having a carbon chain length of 12 aliphatic carbons was substituted for the alpha-olefin oxide utilized in Example 7. A viscous product was obtained which was transferred to a glass container for storage.

EXAMPLE 10

Using the same procedure and proportions of ingredients as in Example 9 except that the alpha-olefin oxide of Example 9 was utilized in an amount of 46.0 grams, a viscous product was prepared.

EXAMPLE 11

Using the same procedure and proportions of ingredients as in Example 7 except that an alpha-olefin oxide in the amount of 27.6 grams having an aliphatic carbon chain of 18 carbons, a viscous product was prepared.

EXAMPLE 12

Using the same procedure and proportions of ingredients as set forth in Example 7 except that an alpha-olefin oxide having an aliphatic carbon chain length of 18 carbons was utilized in the amount of 46.0 grams, a viscous product was prepared.

EXAMPLE 13

Using the same procedure and proportions as described in Example 3 except that an alpha-olefin oxide having an aliphatic chain of about 15 to about 18 carbon atoms sold under the trademark VIKOLOX 15–18 was utilized in the amount of 349.5 grams, a viscous product was prepared.

EXAMPLE 14

The same procedure and proportions as described in Example 3 was used except that an alpha-olefin oxide having an aliphatic carbon chain length of 18 carbon atoms was utilized in the amount of 379.8 grams to produce a viscous product.

EXAMPLE 15

A heteric copolymer of 80 percent by weight ethylene oxide, 15 percent by weight, 1,2-propylene oxide and 5 percent by weight of an alpha-olefin oxide having an aliphatic carbon chain length of 15 to 18 carbon atoms sold under the trademark VIKOLOX 15–18 was prepared according to the following procedure.

A glass flask was charged with 1419 grams of the intermediate copolymer prepared in Example 3 and heated to 105° C. while under a nitrogen atmosphere. While stirring the contents of the flask, there was added 10.2 grams of sodium and the mixture reacted for a period of 24 hours. The intermediate product obtained was cooled to room temperature prior to further use. Thereafter a 250 milliliter centrifuge bottle was charged with 39.2 grams of the intermediate product prepared above together with 15.1 grams of propylene oxide, 80.6 grams of ethylene oxide, and 5.0 grams of an alpha-olefin oxide having an aliphatic carbon chain length of 15 to 18 carbon atoms sold under the trademark VIKOLOX 15–18. The contents of the bottle were mixed at room temperature and then the bottle was stopped with a Teflon covered rubber stopper and the bottle was placed in a 50° C. bath for 44 hours. The reaction bath temperature was then increased to 100° C. and the reaction continued for 24 hours after which the viscous product was bottled for storage.

The following tables illustrate the thickening efficiency of the thickeners of the invention. It will be noted that the control or comparative examples (Examples 1–3) provide a basis for comparison of the thickening efficiency. Examples 2 and 3, which provide thickeners prepared utilizing alpha-olefin oxides having aliphatic chains respectively of 10 and 20 carbon atoms are essentially the same in thickening efficiency as the polyether thickeners of the prior art which are unmodified with an alpha-olefin oxide. The applicants have established a critical range for the carbon chain length of the alpha-olefin oxide, namely, 12 to 18 carbon atoms as shown in Examples 4–15. The improved efficiency obtained in the thickeners of the invention is not obtained at the expense of reduced shear stability as indicated by the results in Table II. It will be noted from the results shown in Table II that, in an aqueous ethylene glycol solution (approximately 40 percent ethylene glycol), the excellent shear stability of the polyether thickening agents of the prior art is maintained in the alpha-olefin oxide-modified polyether thickeners of Examples 4, 5, 6 and 15.

TABLE I

| Kinematic Vicosity - Aqueous Solutions Viscosity (SUS) @ 100° F. | | |
|---|---|---|
| | Weight % of Thickener | |
| Example | 10% | 5% |
| 1 (comparative) | 51 | 35 |
| 2 (comparative) | 61 | — |
| 3 (comparative) | 51 | 32 |
| 4 | 124 | 42 |
| 5 | 2100 | 132 |
| 6 | 8300 | 266 |
| 7 | 890 | 94 |
| 8 | — | 2660 |
| 9 | 116 | — |
| 10 | — | 68 |
| 11 | — | 222 |
| 12 | — | 1300 |
| 13 | 266 | 34 |
| 14 | 513 | 33 |
| 15 | — | 126 |

TABLE II

Shear Stability at 1000 psi. of Thickeners in Aqueous Ethylene Glycol Solutions (Viscosity (SUS) at 100° F.)

| Example | Concentration (% by weight) | Shear Time 3 minutes | 60 minutes | 24 hours |
| --- | --- | --- | --- | --- |
| 1 (control) | 13.8 | 188 | 188 | 187 |
| 4 | 11.9 | 200 | 196 | 194 |
| 5 | 7.5 | 235 | 229 | 221 |
| 6 | 6.3 | 213 | 209 | 195 |
| 15 | 7.0 | 229 | 239 | 225 |

The preceding examples illustrate the various aspects of the invention but are not intended to limit it. Where not otherwise specified throughout this specification and claims, temperatures are given in degrees Centigrade and parts, percentages and proportions are by weight.

While this invention has been described with reference to certain specific embodiments, it will be recognized by those skilled in the art that many variations are possible without departing from the spirit and scope of the invention and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A thickened aqueous composition comprising water and the polyether polyol prepared by reacting ethylene oxide and at least one lower alkylene oxide having 3 to 4 carbon atoms with at least one active hydrogen compound containing at least two active hydrogens to prepare a heteric or block copolymer and further reacting said copolymer with at least one aliphatic glycidyl ether having about 12 to about 18 aliphatic carbon atoms and wherein said glycidyl ether is present in the amount of about 1 percent to about 20 percent by weight based upon the total weight of said thickener.

2. The composition of claim 1 additionally containing ethylene glycol.

3. The composition of claim 2 wherein said polyether is prepared by a heteric polymerization of a mixture of ethylene oxide and propylene oxide with trimethylolpropane as initiator to produce an intermediate heteric copolymer which is subsequently capped with said glycidyl ether to produce a polyether having a molecular weight of about 1000 to about 40,000.

4. The composition comprising water and the polyether prepared by reacting ethylene oxide with at least one active hydrogen compound containing at least two active hydrogens to prepare a homopolymer and further reacting said homopolymer with at least one aliphatic glycidyl ether, said glycidyl ether having about 12 to about 18 aliphatic carbon atoms and wherein said glycidyl ether is present in the amount of about 1 to about 20 percent by weight based on the total weight of said thickener.

5. The composition of claim 4 additionally containing ethylene glycol.

6. The composition of claim 5 wherein said polyether is prepared by the polymerization of a mixture of ethylene oxide with trimethylolpropane as initiator to produce an intermediate which is subsequently capped with said glycidyl ether to produce a polyether having a molecular weight of about 1000 to about 40,000.

7. The process of thickening aqueous systems comprising the addition of an effective thickening amount of a polyether having a molecular weight of about 1000 to about 75,000 prepared by reacting ethylene oxide and at least one lower alkylene oxide having 3 to 4 carbon atoms with at least one active hydrogen aliphatic compound containing at least two active hydrogens to prepare a heteric or block copolymer and further reacting said copolymer with at least one alpha-olefin oxide having a carbon chain length of about 12 to about 18 aliphatic carbon atoms and wherein said alpha-olefin oxide is present in the amount of about 1 percent to about 20 percent by weight based upon the total weight of said polyether.

8. The process of claim 7 wherein said polyether is prepared by polymerizing a mixture of ethylene oxide and at least one of said lower alkylene oxides to prepare a liquid heteric copolymer intermediate which is subsequently capped with said alpha-olefin oxide.

9. The process of claim 7 wherein said polyether is the reaction product of the sequential polymerization of ethylene oxide and at least one of said lower alkylene oxides to prepare an intermediate block copolymer which is subsequently capped with said alpha-olefin oxide.

10. The process of claims 8 or 9 wherein the ethylene oxide residue is present in said polyether in an amount of at least 10 percent by weight of the weight of said polyether and said lower alkylene oxide is selected from the group consisting of propylene oxide, the butylene oxides, tetrahydrofuran and mixtures thereof.

11. The process of claim 10 wherein the proportion of said ethylene oxide residue to the lower alkylene oxide residue in said polyether is in the amount of about 70 to about 99 percent by weight, said lower alkylene oxide residue is present in the amount of about 30 to about 1 percent by weight and said active hydrogen containing aliphatic compound is a polyhydric alcohol having from 2 to 10 carbon atoms and from 2 to 6 hydroxyl groups.

12. The process of claim 11 wherein said polyhydric alcohol is selected from the group consisting of alkane polyols, alkene polyols, alkyne polyols, and oxyalkylene polyols.

13. The process of claim 12 wherein said alkane polyol selected from the group consisting of trimethylolpropane, glycerol, 2,3,5,6-hexanetetrol, sorbitol, and pentaerythritol.

14. The process of claim 13 wherein said aqueous system comprises water or a mixture of water and ethylene glycol and wherein the ratio of said alkane polyol to said alpha-olefin oxide is 1:5 to 1:15.

15. The process of thickening aqueous systems comprising the addition of an effective thickening amount of a polyether having a molecular weight of about 1000 to about 75,000 prepared by reacting ethylene oxide with at least one active hydrogen aliphatic compound containing at least two active hydrogen to prepare a homopolymer and further reacting said homopolymer with at least one alpha-olefin oxide having a carbon chain length of about 12 to about 18 aliphatic carbon atoms and wherein said alpha-olefin oxide is present in the amount of about 1 to about 20 percent by weight based on the total weight of said polyether.

16. The process of thickening aqueous systems comprising the addition of an effective thickening amount of a polyether to said aqueous system wherein said polyether is a polyether
- (A) prepared by reacting ethylene oxide and at least one lower alkylene oxide having 3 to 4 carbon atoms with at least one active hydrogen compound containing at least two active hydrogens to prepare a heteric or block copolymer and further reacting said copolymer with at least one aliphatic glycidyl ether having about 12 to about 18 aliphatic carbon atoms and wherein said glycidyl ether is present in the amount of about 1 percent to about 20 percent by weight based upon the total weight of said thickener, or
- (B) prepared by reacting ethylene oxide with at least one active hydrogen compound containing at least two active hydrogens to prepare a homopolymer and further reacting said homopolymer with at least one aliphatic glycidyl ether, said glycidyl ether having about 12 to about 18 aliphatic carbon atoms and wherein said glycidyl ether is present in the amount of about 1 to about 20 percent by weight based on the total weight of said thickener.

17. The process of claim 16 wherein said polyether thickening agent is the reaction product of the sequential polymerization of ethylene oxide and at least one of said lower alkylene oxides to prepare an intermediate block copolymer which is subsequently capped with said glycidyl ether.

18. The process of claim 16 wherein said polyether is prepared by polymerizing a mixture of ethylene oxide and at least one of said lower alkylene oxides to prepare a liquid heteric copolymer intermediate which is subsequently capped with said glycidyl ether.

19. The process of claim 18 wherein said ethylene oxide residue is present in said polyether in an amount of at least 10 percent by weight of the weight of said polyether and said lower alkylene oxide is selected from the group consisting of propylene oxide, the butylene oxides, tetrahydrofuran and mixtures thereof.

20. The process of claim 19 wherein the proportion of said ethylene oxide residue to said lower alkylene oxide in said polyether is in the amount of about 70 to about 99 percent by weight, said lower alkylene oxide residue is present in the amount of about 30 to about 1 percent by weight and said active hydrogen containing compound is a polyhydric alcohol having about 2 to about 10 carbon atoms and about 2 to about 6 hydroxyl groups.

21. The process of claim 20 wherein said polyhydric alcohol initiator is selected from the group consisting of alkane polyols, alkene polyols, alkyne polyols, aromatic polyols, and oxyalkylene polyols.

22. The process of claim 21 wherein said initiator is an alkane polyol selected from the group consisting of trimethylolpropane, glycerol, 2,3,5,6-hexanetetrol, sorbitol, and pentaerythritol.

23. The process of claim 22 wherein said aqueous system comprises water or a mixture of water and ethylene glycol and wherein the ratio of said initiator to said glycidyl ether is 1:5 to 1:15.

* * * * *